United States Patent
Park et al.

(10) Patent No.: US 11,749,849 B2
(45) Date of Patent: Sep. 5, 2023

(54) BATTERY MODULE WITH FILLER-CONTAINING CURED RESIN LAYERS

(71) Applicant: LG Chem, Ltd., Seoul (KR)

(72) Inventors: Hyoung Sook Park, Daejeon (KR); Ban Seok Choi, Daejeon (KR); Se Woo Yang, Daejeon (KR); Yoon Gyung Cho, Daejeon (KR); Yang Gu Kang, Daejeon (KR); Eun Suk Park, Daejeon (KR); Sang Min Park, Daejeon (KR)

(73) Assignee: LG Energy Solution, Ltd.

( * ) Notice: Subject to any disclaimer, the term of this patent is extended or adjusted under 35 U.S.C. 154(b) by 122 days.

(21) Appl. No.: 16/647,301

(22) PCT Filed: Sep. 17, 2018

(86) PCT No.: PCT/KR2018/010900
§ 371 (c)(1),
(2) Date: Mar. 13, 2020

(87) PCT Pub. No.: WO2019/054817
PCT Pub. Date: Mar. 21, 2019

(65) Prior Publication Data
US 2020/0220124 A1 Jul. 9, 2020

(30) Foreign Application Priority Data

Sep. 15, 2017 (KR) .................. 10-2017-0118739

(51) Int. Cl.
*H01M 10/00* (2006.01)
*H01M 10/613* (2014.01)
(Continued)

(52) U.S. Cl.
CPC ....... *H01M 10/613* (2015.04); *H01M 10/482* (2013.01); *H01M 10/625* (2015.04); *H01M 10/653* (2015.04); *H01M 50/211* (2021.01)

(58) Field of Classification Search
CPC .. H01M 50/20; H01M 10/482; H01M 10/613; H01M 10/625; H01M 10/653;
(Continued)

(56) References Cited

U.S. PATENT DOCUMENTS

| | | | |
|---|---|---|---|
| 2009/0191448 A1 | 7/2009 | Yamamoto et al. | |
| 2010/0221607 A1* | 9/2010 | Hatanaka | H01M 4/62 429/209 |

(Continued)

FOREIGN PATENT DOCUMENTS

| | | |
|---|---|---|
| CN | 101692503 A | 4/2010 |
| CN | 101908640 A | 12/2010 |

(Continued)

OTHER PUBLICATIONS

Extended European Search Report with Written Opinion for Application No. 18856921.4 dated Oct. 15, 2020, 8 pages.

(Continued)

*Primary Examiner* — Nicholas P D'Aniello
(74) *Attorney, Agent, or Firm* — Lerner David LLP

(57) ABSTRACT

A battery module and a method of manufacturing the same are disclosed herein. In some embodiments, a battery module includes a module case having an internal space formed by a top plate, a bottom plate and sidewalls of the module case, a plurality of battery cells disposed in the internal space, a first filler-containing cured resin layer in contact with both the top plate and the plurality of battery cells, and a second filler-containing cured resin layer in contact with both the bottom plate and the plurality of battery cells. The battery module can have excellent power relative to volume, (Continued)

while being manufactured in a simple process and at a low cost.

19 Claims, 7 Drawing Sheets

(51) Int. Cl.
 *H01M 10/625* (2014.01)
 *H01M 10/653* (2014.01)
 *H01M 10/48* (2006.01)
 *H01M 50/211* (2021.01)

(58) Field of Classification Search
 CPC ......... H01M 10/6551; H01M 2220/20; H01M 10/658; Y02E 60/10
 See application file for complete search history.

(56) References Cited

U.S. PATENT DOCUMENTS

| | | |
|---|---|---|
| 2010/0310911 A1 | 12/2010 | Yamamoto et al. |
| 2012/0121944 A1 | 5/2012 | Yamamoto et al. |
| 2013/0157098 A1 | 6/2013 | McLaughlin et al. |
| 2016/0197386 A1 | 7/2016 | Moon et al. |
| 2016/0215184 A1 | 7/2016 | Umino et al. |
| 2016/0233465 A1 | 8/2016 | Lee et al. |
| 2017/0133705 A1 | 5/2017 | Niwa et al. |
| 2017/0288278 A1 | 10/2017 | Ming et al. |
| 2017/0373289 A1 | 12/2017 | Lee et al. |
| 2018/0076493 A1 | 3/2018 | Park et al. |
| 2018/0183117 A1 | 6/2018 | Cho et al. |
| 2018/0301771 A1* | 10/2018 | Jennrich ............ H01M 10/6556 |
| 2020/0277432 A1* | 9/2020 | Park .................... C08G 18/0885 |
| 2020/0277433 A1* | 9/2020 | Cho .................... C08G 18/4277 |
| 2020/0321565 A1* | 10/2020 | Park .................... H01M 50/258 |

FOREIGN PATENT DOCUMENTS

| | | |
|---|---|---|
| CN | 102468461 A | 5/2012 |
| CN | 103165957 A | 6/2013 |
| CN | 105493309 A | 4/2016 |
| CN | 105579490 A | 5/2016 |
| CN | 105670550 A | 6/2016 |
| CN | 205609622 U | 9/2016 |
| CN | 106133944 A | 11/2016 |
| JP | 2003162989 A | 6/2003 |
| JP | 2009181802 A | 8/2009 |
| JP | 20140116239 A | 6/2014 |
| JP | 2015090750 A | 5/2015 |
| JP | 2017526102 A | 9/2017 |
| JP | 2018510463 A | 4/2018 |
| KR | 20160051750 A | 5/2016 |
| KR | 101649613 B1 | 8/2016 |
| KR | 20160105354 A | 9/2016 |
| KR | 20160105358 A | 9/2016 |
| KR | 20160146587 A | 12/2016 |
| WO | 2011061931 A1 | 5/2011 |
| WO | 2016137303 A1 | 9/2016 |
| WO | 2016200231 A1 | 12/2016 |
| WO | WO-2017060038 A1 * | 4/2017 ............... C08K 3/36 |
| WO | 2017104878 A1 | 6/2017 |

OTHER PUBLICATIONS

International Search Report for Application No. PCT/KR2018/010900 dated Dec. 11, 2018, 3 pages.
Chinese Search Report for Application No. 201880060076.X dated Dec. 3, 2021, 3 pages.
Search Report dated Jul. 12, 2022 from Office Action for Chinese Application No. 201880060076.X dated Jul. 21, 2022, 2 pages.
Search Report dated Jan. 10, 2023 from the Office Action for Chinese Application No. 201880060076.X dated Jan. 19, 2023, 3 pages. [See p. 2, categorizing the cited references].

* cited by examiner

[Figure 1]
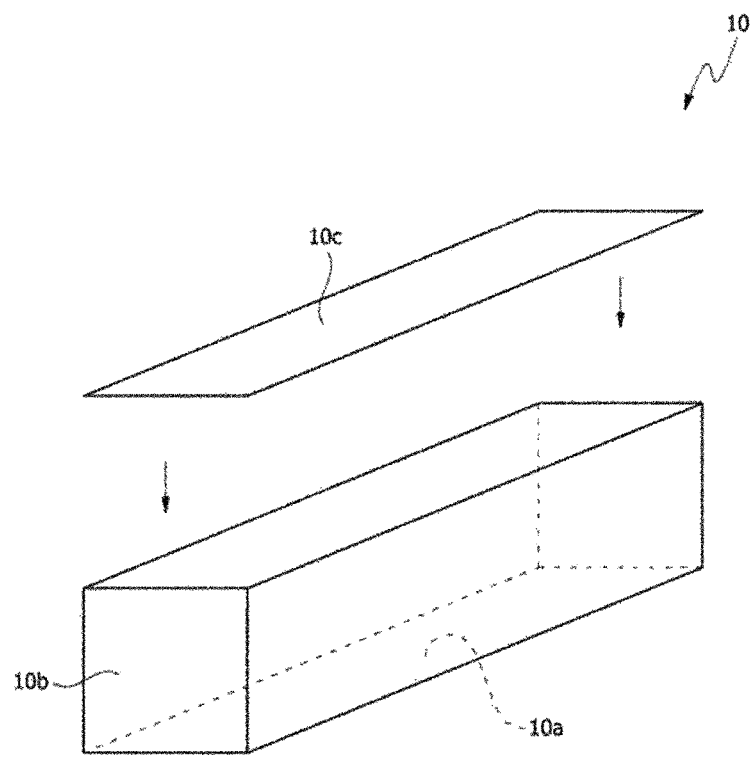

[Figure 2]
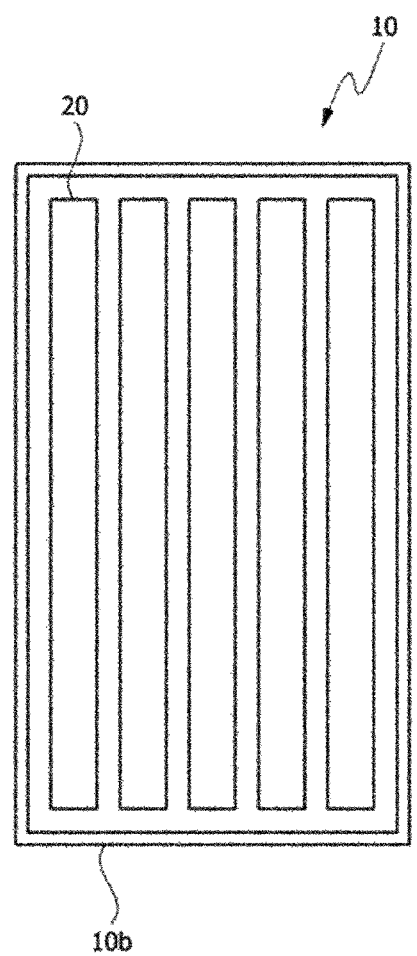

[Figure 3]
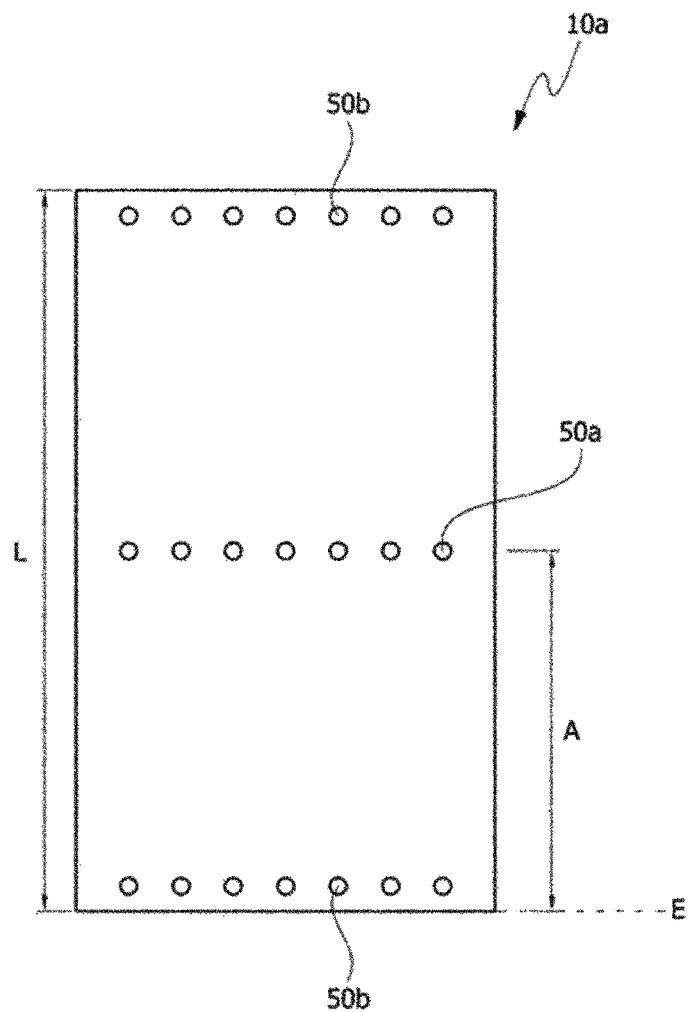

[Figure 4]
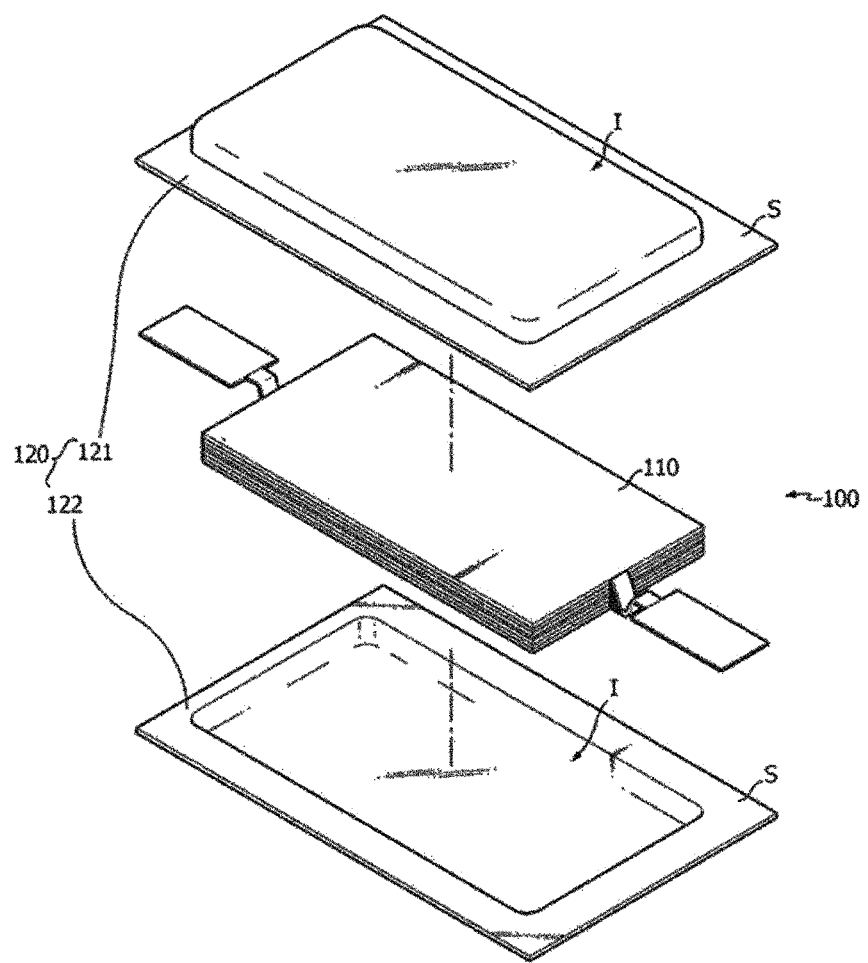

[Figure 5]
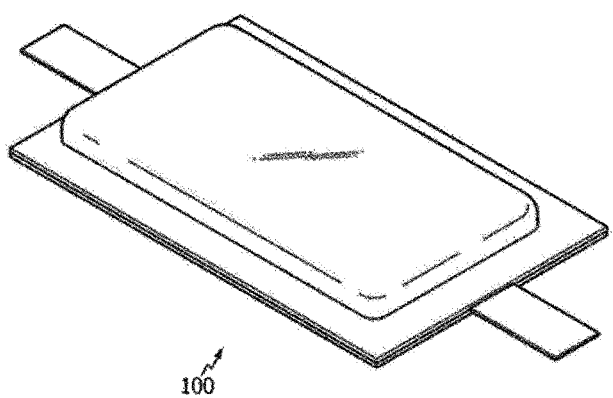

[Figure 6]
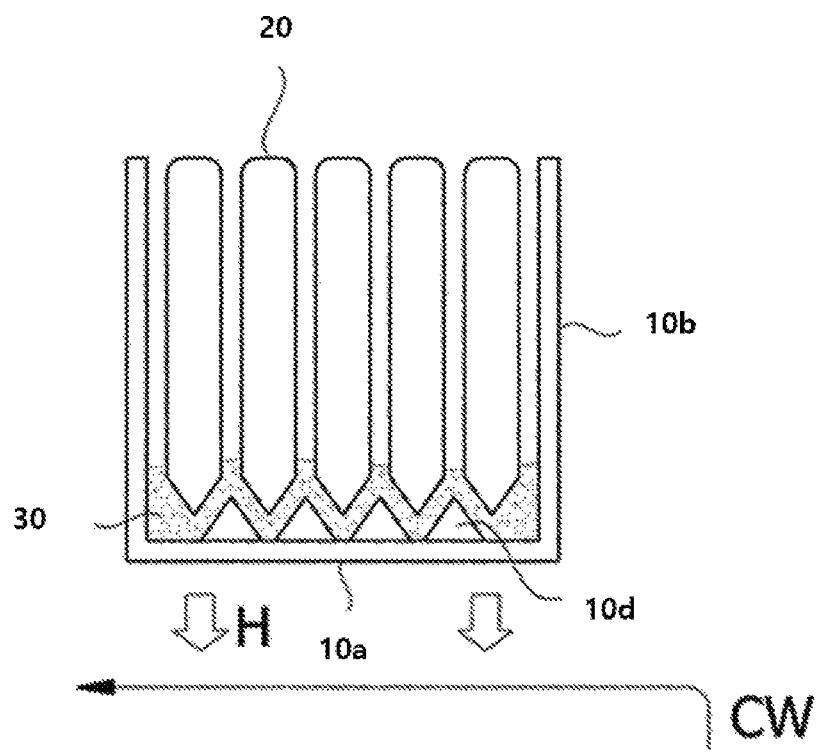

[Figure 7]
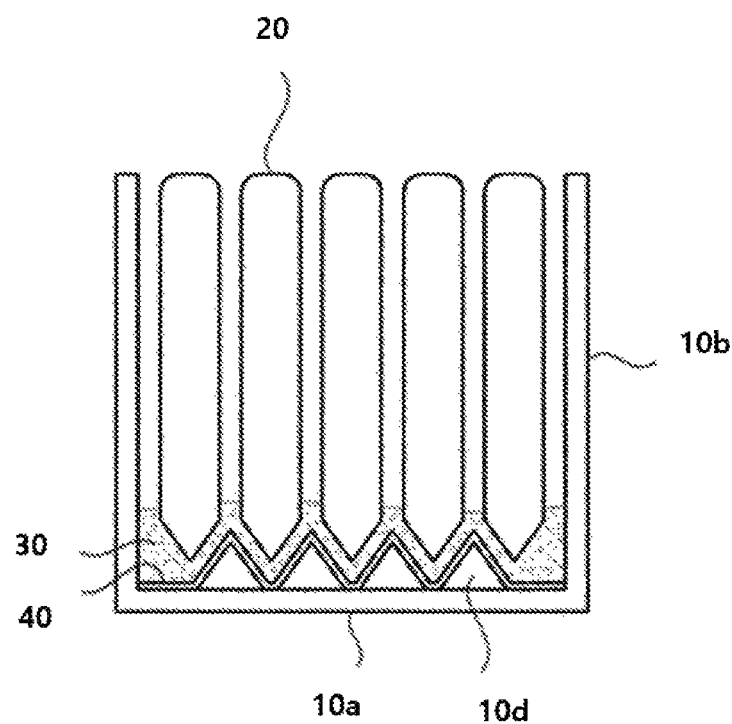

BATTERY MODULE WITH FILLER-CONTAINING CURED RESIN LAYERS

CROSS-REFERENCE TO RELATED APPLICATION(S)

This application is a national phase entry under 35 U.S.C. § 371 of International Application No. PCT/KR2018/010900, filed on Sep. 17, 2018, which claims priority from Korean Patent Application No. 10-2017-0118739, filed on Sep. 15, 2017, the disclosures of which are incorporated by reference herein.

TECHNICAL FIELD

The present application relates to a battery module.

BACKGROUND ART

The secondary battery includes a nickel cadmium battery, a nickel hydride battery, a nickel zinc battery, or a lithium secondary battery, and the like, where a typical example thereof is a lithium secondary battery.

The lithium secondary battery mainly uses lithium oxides and carbon materials as positive electrode and negative electrode active materials, respectively. The lithium secondary battery includes an electrode assembly in which a positive plate and a negative plate coated with a positive electrode active material and a negative electrode active material, respectively, are disposed with a separator interposed therebetween, and an exterior material in which the electrode assembly is sealed and housed together with an electrolyte, which can be classified as a can type secondary battery and a pouch type secondary battery depending on the shape of the exterior material. In this specification, a single secondary battery can be referred to as a battery cell.

When used in medium and large devices such as automobiles or energy storage systems, to increase capacity and power, a large number of battery cells may be electrically connected to each other to constitute a battery module or a battery pack.

In order to construct the battery module or the battery pack in which a plurality of such battery modules is connected, various fastening parts, cooling equipments, and the like are required, where such fastening parts or cooling equipments, and the like cause an increase in the manufacturing cost of the battery module or the battery pack, increase volume and weight, and also reduce the power relative to the increased volume and weight.

In addition, when the battery pack is exposed to external shocks such as vibrations during a use procedure of a vehicle or the like, it is required that the battery pack ensures better durability.

BRIEF DESCRIPTION OF DRAWINGS

FIG. 1 is a diagram showing an exemplary module case that may be applied in the present application.

FIG. 2 is a diagram showing a form in which battery cells are housed in a module case.

FIG. 3 is a diagram of an exemplary bottom plate in which injection holes and observation holes are formed.

FIGS. 4 and 5 are diagrams showing an exemplary battery pouch that may be used as a battery cell.

FIGS. 6 and 7 are diagrams showing the structure of an exemplary battery module.

DISCLOSURE

Technical Problem

The present application can provide a battery module.

Technical Solution

The battery module of the present application comprises a module case and a battery cell. The battery cell may be housed in the module case. One or more battery cells may be present in the module case, and a plurality of battery cells may be housed in the module case. The number of battery cells housed in the module case is adjusted depending on applications and the like, which is not particularly limited. The battery cells housed in the module case may be electrically connected to each other.

The module case may comprise at least sidewalls and a bottom plate which form an internal space in which the battery cell can be housed. The module case may further comprise a top plate for sealing the internal space. The sidewalls, the bottom plate, and the top plate are integrally formed with each other, or the sidewalls, the bottom plate, and/or the top plate as separated from each other are assembled, so that the module case can be formed. The shape and size of such a module case are not particularly limited and may be appropriately selected depending on applications, and the type and number of the battery cell housed in the internal space, and the like.

Here, since there are at least two plates constituting the module case, the term top plate and bottom plate are terms having relative concepts used to distinguish them. That is, it does not mean that in the actual use state, the top plate necessarily exists at the upper portion and the bottom plate necessarily exists at the lower portion.

FIG. 1 is a view showing an exemplary module case (10), which is an example of a box-shaped case (10) comprising one bottom plate (10a) and four sidewalls (10b). The module case (10) may further comprise a top plate (10c) sealing the internal space.

FIG. 2 is a schematic view of the module case (10) of FIG. 1, as observed from above, in which the battery cells (20) are housed.

A hole may be formed in the bottom plate, the sidewalls, and/or the top plate of the module case. Such a hole may be formed on the bottom plate or the like which is in contact with a resin layer to be described below, and may be formed on the top plate and the bottom plate, and the like which are in contact with the resin layer. The hole may be an injection hole for injecting a material (resin composition) for forming the resin layer when the resin layer is formed by an injection process, as described below. At this time, the shape, number and position of the hole can be adjusted in consideration of the injection efficiency of the material for forming the resin layer. In one example, the hole may be formed at least on the bottom plate and the top plate.

In one example, the hole may be formed at about ¼ to ¾ point or about ⅜ to ⅞ point, or approximately the middle, of the total length of the sidewalls, the bottom plate, or the top plate. By injecting the resin composition through the injection hole formed at this point, the resin layer can be injected so as to have a wide contact area. Here, as shown in FIG. 3, ¼, ¾, ⅜, or ⅞ point is, for example, a ratio of the distance (A) to the hole forming position relative to the total length (L) measured based on any one end face (E) of the bottom plate or the like. The end (E) at which the length (L) and the distance (A) are formed may be any end (E) as long as the length (L) and the distance (A) are measured from the same end (E). In FIG. 3, the injection hole (50*a*) is in a form of being located at the approximately middle part of the bottom plate (10*a*).

The size and shape of the injection hole are not particularly limited, and can be formed in consideration of the injection efficiency of a resin layer material to be described below. For example, the hole may have a circular shape, an elliptical shape, a polygonal shape such as triangle or square, or an amorphous shape. The number and spacing of the injection hole are not greatly limited and can be adjusted so that the resin layer can have a wide contact area with the bottom plate or the like, as described above.

An observation hole (for example, 50*b* in FIG. 3) may be formed at the end of the top plate and the bottom plate, and the like where the injection hole is formed. For example, when the material of the resin layer is injected through the injection hole, such an observation hole may be for observing whether the injected material is injected well to the end of the sidewalls, the bottom plate, or the top plate. The position, shape, size, and number of the observation hole are not limited as long as they are formed so that it can be confirmed whether the injected material is properly injected.

The module case may be a thermally conductive case. The term thermally conductive case means a case in which the thermal conductivity of the entire case is 10 W/mK or more, or at least a portion having the thermal conductivity as above is included. For example, at least one of the sidewalls, the bottom plate and the top plate as described above may have the thermal conductivity described above. In another example, at least one of the sidewalls, the bottom plate, and the top plate may comprise a portion having the thermal conductivity.

In the structure of the battery module according to one example of the present application, a first filler-containing cured resin layer in contact with the top plate and the battery cell(s), and a second filler-containing cured resin layer in contact with the bottom plate and the battery cell(s) are included, as described below. In this structure, at least the second filler-containing cured resin layer may be a thermally conductive resin layer, whereby at least the bottom plate may be thermally conductive, or may comprise a thermally conductive portion.

Here, the thermal conductivity of the thermally conductive top plate, bottom plate or side wall or the thermally conductive portion may be 20 W/mK or more, 30 W/mK or more, 40 W/mK or more, 50 W/mK or more, 60 W/mK or more, 70 W/mK or more, 80 W/mK or more, 90 W/mK or more, 100 W/mK or more, 110 W/mK or more, 120 W/mK or more, 130 W/mK or more, 140 W/mK or more, 150 W/mK or more, 160 W/mK or more, 170 W/mK or more, 180 W/mK or more, 190 W/mK or more, or 195 W/mK or more. The higher the value of the thermal conductivity is, the more advantageous it is from the viewpoint of the heat dissipation property of the module, and the like, and the upper limit is not particularly limited. In one example, the thermal conductivity may be about 1,000 W/mK or less, 900 W/mK or less, 800 W/mK or less, 700 W/mK or less, 600 W/mK or less, 500 W/mK or less, 400 W/mK or less, 300 W/mK or less, or 250 W/mK or less, but is not limited thereto. The kind of materials exhibiting the thermal conductivity as above is not particularly limited, and for example, includes metal materials such as aluminum, gold, pure silver, tungsten, copper, nickel, or platinum. The module case may be comprised entirely of the thermally conductive material as above, or at least a part of the module case may be a portion comprised of the thermally conductive material. Accordingly, the module case may have the above-mentioned range of thermal conductivity, or comprise at least a portion having the aforementioned thermal conductivity.

In the module case, the portion having a thermal conductivity in the above range may be a portion in contact with the resin layer and/or the insulating layer as described below. In addition, the portion having the thermal conductivity may be a portion in contact with a cooling medium such as cooling water. According to this structure, a structure capable of effectively discharging heat generated from the battery cell to the outside can be realized.

On the other hand, among physical properties mentioned in this specification, when the measured temperature affects the physical properties, the physical properties may be physical properties measured at room temperature, unless otherwise specified. The term room temperature herein may mean any one temperature within the range of about 10° C. to 30° C., for example, a temperature of about 25° C., about 23° C., or about 20° C. or so.

The type of the battery cell housed in the module case is not particularly limited, and a variety of known battery cells may be applied. In one example, the battery cell may be a pouch type. Referring to FIG. 4, the pouch type battery cell (100) may typically comprise an electrode assembly, an electrolyte, and a pouch exterior material.

FIG. 4 is an exploded perspective view schematically showing the configuration of an exemplary pouch type cell, and FIG. 5 is a combined perspective view of the configuration of FIG. 4.

The electrode assembly (110) included in the pouch type cell (100) may be in a form in which at least one positive plate and at least one negative plate are disposed with each separator interposed therebetween. The electrode assembly (110) may be a wound type in which one positive plate and one negative plate are wound together with the separator, or a stacked type in which a plurality of positive plates and a plurality of negative plates are laminated alternately with each separator interposed therebetween.

The pouch exterior material (120) may be configured in a form equipped with, for example, an outer insulating layer, a metal layer, and an inner adhesive layer. Such an exterior material (120) may comprise a metal thin film, such as aluminum, to protect inner elements such as the electrode assembly (110) and the electrolyte, to complement the electrochemical properties by the electrode assembly (110) and the electrolyte, and to consider heat dissipation or the like. Such a metal thin film may be interposed between insulating layers formed of an insulating material in order to ensure electrical insulation with elements such as the electrode assembly (110) and the electrolyte, or other elements outside the battery (100).

In one example, the exterior material (120) may comprise an upper pouch (121) and a lower pouch (122), where in at least one of the upper pouch (121) and the lower pouch (122), a concave internal space (I) can be formed. The electrode assembly (110) can be housed in the internal space (I) of this pouch. A sealing portion (S) is provided on each outer peripheral surface of the upper pouch (121) and the lower pouch (122) and these sealing portions (S) are bonded to each other so that the internal space accommodating the electrode assembly (110) can be sealed.

Each electrode plate of the electrode assembly (110) is provided with an electrode tab, and one or more electrode tabs may be connected to an electrode lead. The electrode lead may be interposed between the sealing portions (S) of the upper pouch (121) and the lower pouch (122) and exposed to the outside of the exterior material (120) to function as an electrode terminal of the secondary battery (100).

The shape of the pouch type cell is one example, and the battery cell applied in the present application is not limited to the above-described kind. In the present application, various shapes of known pouch type cells or other types of cells can be all applied as battery cells.

The battery module of the present application may further comprise a resin layer. Specifically, the battery module of the present application may comprise at least a filler-containing cured resin layer. In the present application, the term filler-containing cured resin layer is a layer containing a resin component and a filler. The term cured resin layer means a layer formed by curing a resin composition having a low viscosity to the extent that it is in a liquid phase or has sufficient fluidity. Here, the low viscosity having a liquid phase or sufficient fluidity may mean a range of about 400 cP or less, or 100 to 400 cP (based on room temperature and a shear rate of 2.5/s). The viscosity is a result of measurement according to a method of an example to be described below. The lower limit of the viscosity is not particularly limited as long as the resin composition has a sufficient low viscosity, but it may be generally about 10 Pas or more. In addition, the viscosity is the viscosity of the resin composition before curing.

The battery module may comprise, as the filler-containing cured resin layer, a first filler-containing cured resin layer in contact with the top plate and the battery cell, and a second filler-containing cured resin layer in contact with the bottom plate and the battery cell.

In one example, each of the resin layers may also be an adhesive layer. The term adhesive layer means a case where the adhesive force of the resin layer is at least 150 gf/10 mm or more, 200 gf/10 mm or more, 250 gf/10 mm or more, 300 gf/10 mm or more, 350 gf/10 mm or more, or 400 gf/10 mm or more. The adhesive force is measured for an aluminum pouch according to a method disclosed in an example to be described below. The upper limit of the adhesive force of the resin layer is not particularly limited, which may be, for example, about 2,000 gf/10 mm or less, 1,500 gf/10 mm or less, 1,000 gf/10 mm or less, 900 gf/10 mm or less, 800 gf/10 mm or less, 700 gf/10 mm or less, 600 gf/10 mm or less, or 500 gf/10 mm or less or so.

By forming at least two filler-containing cured resin layers in the battery module as described above, a battery module having excellent durability against external impacts or vibrations can be provided.

In the battery module of the present application, at least one of the sidewall, the bottom plate and the top plate in contact with the resin layer may be the above-described thermally conductive sidewall, bottom plate or top plate. On the other hand, in this specification, the term contact may also mean a case where, for example, the top plate, the bottom plate and/or the side wall or the battery cell is in direct contact with the resin layer or another element, for example, an insulating layer or the like exists therebetween. In addition, the resin layer in contact with the thermally conductive sidewall, bottom plate or top plate may be in thermal contact with the target. At this time, the thermal contact may mean a state that the resin layer is in direct contact with the bottom plate or the like, or other elements, for example, an insulating layer or the like as described below, between the resin layer and the bottom plate or the like are present, but the other element does not interfere with heat transfer from the battery cell to the resin layer, and from the resin layer to the bottom plate or the like. Here, the phrase "does not interfere with heat transfer" means the case that even when other elements (e.g., an insulating layer or a guiding portion as described below) exists between the resin layer and the bottom plate or the like, the total thermal conductivity of the other elements and the resin layer is about 1.5 W/mK or more, about 2 W/mK or more, 2.5 W/mK or more, 3 W/mK or more, 3.5 W/mK or more, or 4 W/mK or more, or the total thermal conductivity of the resin layer and the bottom plate or the like in contact therewith is included in the range even when the other elements are present. The thermal conductivity of the thermal contact may be 50 W/mK or less, 45 W/mK or less, 40 W/mK or less, 35 W/mK or less, 30 W/mK or less, 25 W/mK or less, 20 W/mK or less, 15 W/mK or less, 10 W/mK or less, 5 W/mK or less, 4.5 W/mK or less, or about 4.0 W/mK or less. This thermal contact can be achieved by controlling the thermal conductivity and/or the thickness of the other element when the other element is present.

Among the first and second filler-containing curable resin layers, at least a thermally conductive cured resin layer to be described below may be in thermal contact with the bottom plate or the like and may also be in thermal contact with the battery cell. By adopting such a structure, various fastening parts or cooling equipment of the module, and the like, which was previously required in the construction of a general battery module or a battery pack as an assembly of such modules, is greatly reduced, and simultaneously it is possible to implement a module in which more battery cells are housed per unit volume, while ensuring heat dissipation characteristics. Accordingly, the present application can provide a battery module having high power while being more compact and lighter.

FIG. 6 is an exemplary cross-sectional diagram of the battery module, and for example, the module may be in a form which comprises a case (10) including sidewalls (10b) and a bottom plate (10a); a plurality of battery cells (20) housed inside the case and a resin layer (30) in contact with both the battery cell (20) and the case (10), as shown in FIG. 6. FIG. 6 is a diagram of the resin layer (30) existing on the side of the bottom plate (10a), but the battery module of the present application also comprises a resin layer in the form of FIG. 6 on the side of the top plate.

In the above structure, the bottom plate or the like in contact with the resin layer (30) may be the thermally conductive bottom plate or the like as described above.

The contact area between the resin layer and the bottom plate or the like may be about 70% or more, about 75% or more, about 80% or more, about 85% or more, about 90% or more, or about 95% or more, relative to the total area of the bottom plate or the like. The upper limit of the contact area is not particularly limited, and may be, for example, 100% or less, or less than about 100%.

When the top plate or the bottom plate is thermally conductive and the cured resin layer in contact therewith is also thermally conductive, the thermally conductive portion or the thermally conductive bottom plate or the like may be a portion in contact with a cooling medium such as cooling water. That is, as schematically shown in FIG. 6, the heat (H) can be easily discharged to the bottom plate or the like by the above structure, and heat release can be easily performed even in more simplified structures by contacting this bottom plate or the like with the cooling medium (CW).

The first and second cured resin layers may each have a thickness in a range of, for example, about 100 μm to 5 mm or in a range of about 200 μm to 5 mm. In the structure of the present application, the thickness of the resin layer may be set to an appropriate thickness in consideration of the desired heat dissipation characteristics or durability. The thickness may be the thickness of the thinnest portion of the resin layer, the thickness of the thickest portion, or the average thickness.

As shown in FIG. 6, a guiding portion (10d) which can guide the housed battery cell (20) may also be present on at least one surface of the inside of the module case (10), for example, a surface (10a) in contact with the resin layer (30). At this time, the shape of the guiding portion (10d) is not particularly limited, and an appropriate shape can be employed in consideration of the shape of the battery cell to be applied, where the guiding portion (10d) may be integrally formed with the bottom plate or the like, or may be attached separately thereto. The guiding portion (10d) may be formed using a thermally conductive material, for example, a metallic material such as aluminum, gold, pure silver, tungsten, copper, nickel, or platinum in consideration of the above-described thermal contact. In addition, although not shown in the drawings, an interleaf or an adhesive layer may also be present between the housed battery cells (20). Here, the interleaf can act as a buffer upon charging and discharging the battery cell.

The resin layer or the battery module, to which the resin layer is applied, may have at least one or more physical properties out of physical properties to be described below. Each physical property to be described below is independent, and any one physical property does not give priority over other physical properties, and the resin layer can satisfy at least one or two or more physical properties as described below.

In one example, at least one of the first and second filler-containing cured resin layers may be a thermally conductive resin layer. In this case, the thermal conductivity of the thermally conductive resin layer may be about 1.5 W/mK or more, about 2 W/mK or more, 2.5 W/mK or more, about 3 W/mK or more, about 3.5 W/mK or more, or 4 W/mK or more. The thermal conductivity may be 50 W/mK or less, 45 W/mK or less, 40 W/mK or less, 35 W/mK or less, 30 W/mK or less, 25 W/mK or less, 20 W/mK or less, 15 W/mK or less, 10 W/mK or less, 5 W/mK or less, 4.5 W/mK or less, or about 4.0 W/mK or less. When the resin layer is a thermally conductive resin layer as above, the bottom plate, the top plate and/or the sidewall, and the like to which the resin layer is attached may be a portion having the above-described thermal conductivity of 10 W/mK or more. At this time, the module case portion representing the thermal conductivity may be a part in contact with a cooling medium, for example, cooling water or the like. The thermal conductivity of the resin layer is, for example, a value measured according to ASTM D5470 standard or ISO 22007-2 standard. The method of setting the thermal conductivity of the resin layer in the above-mentioned range is not particularly limited. For example, the thermal conductivity of the resin layer may be adjusted by using a filler having thermal conductivity as the filler contained in the resin layer.

For example, it is known that among resin components generally known to be usable as adhesives, acrylic resins, urethane resins, and silicone resins have similar heat conduction properties to one another, and epoxy resins have superior thermal conductivity to that of these resins, and olefin resins have higher thermal conductivity than that of the epoxy resins. Therefore, it is possible to select one having excellent thermal conductivity among the resins as needed. However, since the desired thermal conductivity is hardly ensured by only the resin components, it is also possible to apply a method in which filler components having excellent thermal conductivity are contained in the resin layer at an appropriate ratio, as described below.

In the first and second filler-containing cured resin layers included in the battery module, both may be thermally conductive resin layers having the thermal conductivity, and at least one may be the thermally conductive resin layer. In one example, any one of the first and second filler-containing cured resin layers may be the thermally conductive resin layer and the other may be a resin layer having a low thermal conductivity. Such a structure may be advantageous to the heat dissipation characteristic of the battery module.

In this case, the thermal conductivity of the resin layer having a low thermal conductivity may be less than 1.5 W/mK, about 1 W/mK or less, about 0.8 W/mK or less, 0.6 W/mK or less, 0.4 W/mK or less, or 0.2 W/mK or less. Here, the lower limit of the thermal conductivity is not particularly limited, which may be about 0 W/mK or more or more than 0 W/mK.

In the battery module, the resin layer or the battery module, to which the resin layer is applied, may have a thermal resistance of 5 K/W or less, 4.5 K/W or less, 4 K/W or less, 3.5 K/W or less, 3 K/W or less, or about 2.8 K/W. When the resin layer or the battery module, to which the resin layer is applied, is adjusted in order to exhibit such a range of thermal resistance, excellent cooling efficiency or heat dissipation efficiency can be secured. The method of measuring the thermal resistance is not particularly limited. For example, it can be measured according to ASTM D5470 standard or ISO 22007-2 standard.

After a thermal shock test, for example, a thermal shock test, one cycle of which is composed of holding the battery module at a low temperature of −40° C. for 30 minutes, and then again holding it for 30 minutes after increasing the temperature to 80° C., that the cycle is repeated 100 times, it may be required for the resin layer to be formed such that the resin layer cannot be detached or peeled off from the module case or the battery cell of the battery module or cracks cannot be caused. For example, when the battery module is applied to a product, such as an automobile, requiring a long guarantee period (for example, about 15 years or more in the case of the automobile), performance may be required in the same level as above to ensure durability.

The first and second filler-containing cured resin layers may be electrically insulating resin layers. In the structure described above, by exhibiting electrical insulation, the resin layer can maintain the performance of the battery module and secure stability. The electrically insulating resin layer may have an insulation breakdown voltage, as measured according to ASTM D149, of about 3 kV/mm or more, about 5 kV/mm or more, about 7 kV/mm or more, 10 kV/mm or more, 15 kV/mm or more, or 20 kV/mm or more. The higher the value of the insulation breakdown voltage is, the resin layer shows more excellent insulation, and thus the voltage is not particularly limited, but may be about 50 kV/mm or less, 45 kV/mm or less, 40 kV/mm or less, 35 kV/mm or less, or 30 kV/mm or less in consideration of composition of the resin layer or the like. The insulation breakdown voltage as above may also be controlled by controlling the insulating property of the resin component in the resin layer, and for example, the insulation breakdown voltage can be controlled by applying insulating fillers in the resin layer. In general, among the thermally conductive fillers, ceramic fillers as described below are known as a component capable of ensuring insulation.

As the first and second filler-containing cured resin layers, a flame retardant resin layer can be applied in consideration of stability. The term flame retardant resin layer in the present application may mean a resin layer showing a V-0 rating in UL 94 V Test (Vertical Burning Test). This can secure stability against fires and other accidents that may occur in the battery module.

The first and second filler-containing cured resin layers may have a specific gravity of 5 or less. In another example, the specific gravity may be 4.5 or less, 4 or less, 3.5 or less, or 3 or less. The resin layer showing the specific gravity in this range is advantageous for manufacturing a lightweight battery module. The lower the value of the specific gravity is, the more advantageous the lightening of the module is, and thus the lower limit is not particularly limited. For example, the specific gravity can be about 1.5 or more, or 2 or more. The components added to the resin layer can be adjusted so that the resin layer exhibits the specific gravity in the above range. For example, when the fillers are added, a method of applying fillers capable of securing a desired thermal conductivity even at a low specific gravity, if possible, that is, fillers having a low specific gravity or surface-treated fillers, and the like may be used.

It is appropriate that the first and second filler-containing cured resin layers do not contain volatile substances, if possible. For example, the resin layer may have a ratio of non-volatile components of 90 weight % or more, 95 weight % or more, or 98 weight % or more. Here, the non-volatile components and the ratio thereof can be specified in the following manner. That is, the non-volatile content can be defined as the remaining portion after the resin layer is maintained at 100° C. for about 1 hour, and thus the ratio can be measured based on the initial weight of the resin layer and the ratio after the resin layer is maintained at 100° C. for about 1 hour.

The first and second filler-containing cured resin layers may have excellent resistance to deterioration, if necessary, but it may be required to have stability that the surface of the module case or the battery cell is chemically unreactive, if possible.

It may be advantageous that the first and second filler-containing cured resin layers have also a low shrinkage ratio during the process of curing or after curing. This can prevent the occurrence of peeling or voids that may occur during the manufacture or use process of the module. The shrinkage ratio can be appropriately adjusted within a range capable of exhibiting the above-mentioned effect, and can be, for example, less than 5%, less than 3% or less than about 1%. The lower the value of the shrinkage ratio is, the more advantageous the shrinkage ratio is, and thus the lower limit is not particularly limited.

It may be advantageous that the first and second filler-containing cured resin layers have also a low coefficient of thermal expansion (CTE). This can prevent the occurrence of peeling or voids that may occur during the manufacture or use process of the module. The coefficient of thermal expansion can be appropriately adjusted within a range capable of exhibiting the above-described effects, and can be, for example, less than 300 ppm/K, less than 250 ppm/K, less than 200 ppm/K, less than 150 ppm/K or less than about 100 ppm/K. The lower the value of the coefficient of thermal expansion is, the more advantageous the coefficient is, and thus the lower limit is not particularly limited.

The tensile strength of the first and second filler-containing cured resin layers can be appropriately adjusted, whereby excellent impact resistance and the like can be secured to provide a module showing appropriate durability. The tensile strength can be adjusted, for example, in the range of about 1.0 MPa or more.

The elongation of the first and second filler-containing cured resin layers can be appropriately adjusted, whereby excellent impact resistance and the like can be secured to provide a module showing appropriate durability. The elongation can be adjusted, for example, in the range of about 10% or more, or about 15% or more.

It may be advantageous that the first and second filler-containing cured resin layers also exhibit an appropriate hardness. For example, if the hardness of the resin layer is too high, the resin layer becomes excessively brittle, which may adversely affect reliability. Also, by controlling the hardness of the resin layer, the impact resistance and the vibration resistance can be secured, and the durability of the product can be ensured. The resin layer may have, for example, a hardness in Shore A type of less than 100, 99 or less, 98 or less, 95 or less, or 93 or less, or a hardness in Shore D type of less than about 80, about 70 or less, about 65 or less, or about 60 or less. The lower limit of the hardness is not particularly limited. For example, the hardness in Shore A type may be 60 or more, or the hardness in Shore OO type may be 5 or more, or about 10 or more. The hardness of the resin layer usually depends on the type and the ratio of the fillers contained in the resin layer, and when an excessive amount of fillers is included, the hardness is usually increased. However, the resin component included in the resin layer also affects the hardness, as the silicone resins usually show a lower hardness than other resins such as epoxy or urethane.

The first and second filler-containing cured resin layers may also have a 5% weight loss temperature in a thermogravimetric analysis (TGA) of 400° C. or more, or an 800° C. balance may be 70 weight % or more. By such a characteristic, the battery module can have more improved stability at high temperature. In another example, the 800° C. balance may be about 75 weight % or more, about 80 weight % or more, about 85 weight % or more, or about 90 weight % or more. In another example, the 800° C. balance may be about 99 weight % or less. The thermogravimetric analysis (TGA) can be conducted within a range of 25° C. to 800° C. at a temperature raising rate of 20° C./minute under a nitrogen ($N_2$) atmosphere of 60 $cm^3$/minute. The thermogravimetric analysis (TGA) results can also be achieved by controlling the composition of the resin layer. For example, the 800° C. balance usually depends on the type or ratio of the fillers contained in the resin layer, and when an excess amount of the fillers is contained, the balance increases. However, since the silicone resins generally have higher heat resistance than other resins such as epoxy or urethane, the balance is higher, whereby the resin component included in the resin layer also affects the hardness.

As long as the battery cell can be effectively fixed and, if necessary, the above-mentioned physical properties can be imparted, the kind of the resin layer is not particularly limited, and all the known curable resin materials can be used. The usable resin material may include an acrylic resin, an epoxy resin, a urethane resin, an olefin resin, a urethane resin, an EVA (ethylene vinyl acetate) resin or a silicone resin, and the like, and thus the resin layer may comprise the resin. The resin layer may comprise the resin as a main component among resin components. That is, among the total resin components included in the resin layer, the acrylic resin, the epoxy resin, the urethane resin, the olefin resin, the urethane resin, the EVA (ethylene vinyl acetate) resin or the silicone resin, and the like may be included in an amount of about 70% or more, about 75% or more, about 80% or more, about 85% or more, or about 90% or more on the basis of weight. The ratio may be about 99% or less or about 95% or less.

The material for forming the resin layer, that is, the resin composition may be an adhesive material as described above, and may be a solvent type, a water-based type or a solventless type, but the solventless type resin layer may be appropriate in consideration of convenience of the manufacturing process to be described below, and the like.

The resin layer material may be an active energy beam curing type, a moisture curing type, a thermosetting type, a room temperature curing type, or the like, and the room temperature curing type may also be appropriate in consideration of the convenience of the manufacturing process to be described below, and the like.

As described above, the first and second filler-containing cured resin layers are layers formed by curing the curable resin composition. For the implementation of the unique structure of the present application, the curable resin composition is required to have the following physical properties. First, if necessary, in order to secure thixotropy or thermal conductivity, a large amount of fillers may be contained in the resin composition, and in this case, in order to secure injection processability or the like, it is necessary for the resin composition to exhibit the sufficiently low viscosity as described above. In addition, if only the low viscosity is simply shown, it is also difficult to ensure processability, so that appropriate thixotropy is required, and it may be necessary that the curing itself progresses at room temperature while exhibiting excellent adhesive force by curing.

In the present application, a urethane resin composition is applied as the resin composition securing such characteristics. That is, the resin layer may be a urethane resin layer, that is, a resin layer containing a urethane resin as a main component in resin components.

The urethane resin composition may be a two-component type comprising a main composition part containing at least a polyol or the like; and a curing agent composition part containing at least an isocyanate compound, and the resin layer may be formed by compounding such a two-component type to prepare a resin composition and curing the composition.

Therefore, the urethane resin layer may comprise at least the polyol-derived unit and the polyisocyanate-derived unit. In this case, the polyol-derived unit may be a unit formed by urethane-reacting the polyol with the polyisocyanate, and the polyisocyanate-derived unit may be a unit formed by urethane-reacting the polyisocyanate with the polyol.

As the urethane resin composition, a resin composition containing at least a polyol which is amorphous or has low crystallinity as the polyol contained in the main composition may be applied for securing the physical properties.

Here, the term amorphous means a case where a crystallization temperature (Tc) and a melting temperature (Tm) are not observed in a DSC (differential scanning calorimetry) analysis, and at this time, the DSC analysis can be performed in a range of −80° C. to 60° C. at a rate of 10° C./minute, which can be measured, for example, by a method of raising the temperature from 25° C. to 60° C. at the above rate, lowering it to −80° C. again and raising it to 60° C. again. Furthermore, the sufficiently low crystallinity herein means a case where the melting point (Tm) observed in the DSC analysis is about 20° C. or lower, about 15° C. or lower, about 10° C. or lower, about 5° C. or lower, about 0° C. or lower, about −5° C. or lower, about −10° C. or lower, or about −20° C. or lower. The lower limit of the melting point is not particularly limited, and for example, the melting point may be about −80° C. or higher, about −75° C. or higher, or about −70° C. or higher.

As the polyol as above, an ester-based polyol to be described below can be exemplified. That is, among the ester-based polyols, a carboxylic acid-based polyol or a caprolactone-based polyol, specifically polyol having a structure to be described below, effectively satisfies the above-mentioned characteristics.

Generally, the carboxylic acid-based polyol is formed by a urethane reaction of a component comprising dicarboxylic acid and polyol (e.g. diol or triol), and the caprolactone-based polyol is formed by reacting caprolactone and polyol (e.g. diol or triol), where the polyol satisfying the above-described physical properties can be constituted through control of the kind and ratio of each component.

In one example, the polyol may be polyol represented by Formula 1 or 2 below.

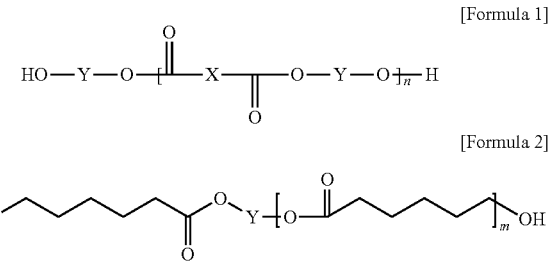

In Formulas 1 and 2, X is a dicarboxylic acid-derived unit, Y is a polyol-derived unit, for example, a triol or diol unit, and n and m are arbitrary numbers.

Here, the dicarboxylic acid-derived unit is a unit formed by a urethane reaction of dicarboxylic acid with polyol, and the polyol-derived unit is a unit formed by a urethane reaction of polyol with dicarboxylic acid or caprolactone.

That is, when a hydroxyl group of the polyol and a carboxyl group of the dicarboxylic acid are reacted, a water ($H_2O$) molecule is desorbed by a condensation reaction to form an ester bond, where after the dicarboxylic acid forms the ester bond by the condensation reaction, X in Formula 1 above means a moiety excluding the ester bond moiety, and after the polyol also forms the ester bond by the condensation reaction, Y is a moiety excluding the ester bond, and the ester bond is represented in Formula 1.

In addition, after the polyol forms an ester bond with caprolactone, Y in Formula 2 also represents a moiety excluding the ester bond.

On the other hand, when the polyol-derived unit of Y herein is a unit derived from polyol containing three or more hydroxyl groups such as a triol unit, a structure in which the Y moiety is branched in the structure of the above formula may be realized.

The kind of the dicarboxylic acid-derived unit of X in Formula 1 above is not particularly limited, but it may be any one unit selected from the group consisting of a phthalic acid-derived unit, an isophthalic acid-derived unit, a terephthalic acid-derived unit, a trimellitic acid-derived unit, a tetrahydrophthalic acid-derived unit, a hexahydrophthalic acid-derived unit, a tetrachlorophthalic acid-derived unit, an oxalic acid-derived unit, an adipic acid-derived unit, an azelaic acid-derived unit, a sebacic acid-derived unit, a succinic acid-derived unit, a malic acid-derived unit, a glutaric acid-derived unit, a malonic acid-derived unit, a pimelic acid-derived unit, a suberic acid-derived unit, a 2,2-dimethylsuccinic acid-derived unit, a 3,3-dimethylglutaric acid-derived unit, a 2,2-dimethylglutaric acid-derived unit, a maleic acid-derived unit, a fumaric acid-derived unit, an itaconic acid-derived unit and a fatty acid-derived unit for securing units and desired physical properties, and an aliphatic dicarboxylic acid-derived unit is more advantageous than an aromatic dicarboxylic acid-derived unit in consideration of the glass transition temperature of the cured resin layer.

On the other hand, in Formulas 1 and 2, the kind of the polyol-derived unit of Y is not particularly limited, but it may be any one or two or more selected from the group consisting of an ethylene glycol-derived unit, a propylene glycol-derived unit, a 1,2-butylene glyco-derived 1 unit, a 2,3-butylene glycol-derived unit, a 1,3-propanediol-derived unit, a 1,3-butanediol-derived unit, a 1,4-butanediol-derived unit, a 1,6-hexanediol-derived unit, a neopentyl glycol-derived unit, a 1,2-ethylhexyldiol-derived unit, a 1,5-pentanediol-derived unit, a 1,10-decanediol-derived unit, a 1,3-cyclohexanedimethanol-derived unit, a 1,4-cyclohexanedimethanol-derived unit, a glycerin-derived unit and a trimethylol propane-derived unit for securing units and desired physical properties.

On the other hand, in Formula 1 above, n is a number, and the range may be selected in consideration of desired physical properties, and may be, for example, about 2 to 10 or 2 to 5.

Also, in Formula 2 above, m is a number, and the range may be selected in consideration of desired physical properties, and may be, for example, about 1 to 10 or 1 to 5.

When n and m in Formulas 1 and 2 are excessively large, the crystallinity of the polyol can be strongly expressed.

The molecular weight of this polyol may be adjusted in consideration of desired low viscosity characteristics, durability or adhesiveness, and the like, which may be, for example, in a range of about 300 to 2,000. The molecular weight mentioned in this specification may be, for example, a weight average molecular weight measured by using GPC (gel permeation chromatograph), and unless otherwise specified herein, the molecular weight of a polymer means a weight average molecular weight.

The kind of the polyisocyanate contained in the curing agent composition part of the urethane resin composition is not particularly limited, but it may be advantageous that it is an alicyclic series in order to secure desired physical properties.

That is, the polyisocyanate may be an aromatic polyisocyanate compound such as tolylene diisocyanate, diphenylmethane diisocyanate, phenylenediisocyanate, polyethylenephenylene polyisocyanate, xylene diisocyanate, tetramethylxylylene diisocyanate, trizine diisocyanate, naphthalene diisocyanate and triphenylmethane triisocyanate, an aliphatic polyisocyanate such as hexamethylene diisocyanate, trimethylhexamethylene diisocyanate, lysine diisocyanate, norbornane diisocyanate methyl, ethylene diisocyanate, propylene diisocyanate or tetramethylene diisocyanate, or an alicyclic polyisocyanate such as transcyclohexane-1,4-diisocyanate, isoboron diisocyanate, bis(isocyanate methyl)cyclohexane diisocyanate or dicyclohexylmethane diisocyanate, and the like, a carbodiimide-modified polyisocyanate or an isocyanurate-modified polyisocyanate of any one or two or more of the foregoing, and the like can be used, but the application of polyisocyanates other than aromatics is appropriate.

The ratio of the polyol to the polyisocyanate in the resin composition is not particularly limited and is appropriately controlled so as to enable the urethane reaction thereof.

In order to incorporate other components, such as a filler and a flame retardant to be described below, into the resin layer, desired additives may be compounded to the main composition part and/or the curing agent composition part of the resin composition and cured.

The resin layer may comprise a filler in consideration of thermal conductivity, insulation, heat resistance (TGA analysis) or specific gravity, and the like as described above. If necessary, through use of an appropriate filler, the thermal conductivity in the above-mentioned range or the like can be secured. In one example, the filler included in at least the thermally conductive filler-containing cured resin layer may be a thermally conductive filler. In the present application, the term thermally conductive filler means a material having thermal conductivity of about 1 W/mK or more, about 5 W/mK or more, about 10 W/mK or more, or about 15 W/mK or more. The thermal conductivity of the thermally conductive filler may be about 400 W/mK or less, about 350 W/mK or less, or about 300 W/mK or less. The kind of the usable thermally conductive filler is not particularly limited, but a ceramic filler may be applied in consideration of the insulating property and the like. For example, ceramic particles such as alumina, AlN (aluminum nitride), BN (boron nitride), silicon nitride, SiC or BeO may be used. In addition, if the insulating properties of the resin layer can be ensured, application of a carbon filler such as graphite may also be considered. The shape or ratio of the filler contained in the resin layer is not particularly limited, which may be selected in consideration of viscosity of the resin composition, possibility of settling in the resin layer, the desired heat resistance or thermal conductivity, insulation, a filling effect or dispersion, and the like. Generally, the larger the size of the filler, the higher the viscosity of the resin composition and the higher the possibility that the filler precipitates in the resin layer. Furthermore, the smaller the size, the thermal resistance tends to be increased. Therefore, an appropriate type of filler may be selected in consideration of the above points, and two or more fillers may also be used, if necessary. Considering the filling amount, it is advantageous to use a spherical filler, but considering network formation or conductivity, a filler in a form such as needle-like morphology or flattened morphology may also be used. In one example, the resin layer may comprise a thermally conductive filler having an average particle diameter in a range of 0.001 µm to 80 µm. In another example, the average particle diameter of the filler may be 0.01 µm or more, 0.1 or more, 0.5 µm or more, 1 µm or more, 2 µm or more, 3 µm or more, 4 µm or more, 5 µm or more, or about 6 µm or more. In another example, the average particle diameter of the filler may be about 75 µm or less, about 70 µm or less, about 65 µm or less, about 60 µm or less, about 55 µm or less, about 50 µm or less, about 45 µm or less, about 40 µm or less, about 35 µm or less, about 30 µm or less, about 25 µm or less, about 20 µm or less, about 15 µm or less, about 10 µm or less, or about 5 µm or less.

The ratio of the filler contained in the thermally conductive resin layer can be selected in consideration of the characteristics of the resin layer so that the above-mentioned characteristics, for example, thermal conductivity, insulation, and the like can be secured. For example, the filler may be contained in a range of about 50 to 2,000 parts by weight relative to 100 parts by weight of the resin component in the resin layer. In another example, the part by weight of the filler may be about 100 parts by weight or more, about 150 parts by weight or more, about 200 parts by weight or more, about 250 parts by weight or more, about 300 parts by weight or more, about 350 parts by weight or more, about 400 parts by weight or more, about 500 parts by weight or more, about 550 parts by weight or more, about 600 parts by weight or more, or about 650 parts by weight or more.

The filler-containing cured resin layer that is not thermally conductive may also comprise a filler depending on the purpose, for example, for securing thixotropy. In this case, the filler need not be thermally conductive, and the ratio thereof is not required to be particularly large, as long as adequate thixotropy is ensured.

The type of the filler included in this resin layer is not particularly limited, but may be, for example, fumed silica, clay or calcium carbonate, and the like. Of course, if necessary, the resin layer may also comprise a small amount of a suitable kind among the above-mentioned thermally conductive fillers. The shape or ratio of the filler is not particularly limited, which may be selected in consideration of the viscosity of the resin composition, the sedimentation possibility in the resin layer, the thixotropy, the insulating property, the filling effect or the dispersibility, and the like. As described above, a suitable type of filler can be selected in consideration of the viscosity of the resin composition, the sedimentation possibility of the filler or thermal resistance, and the like, and two or more kinds of fillers may also be used, if necessary. In one example, the average particle diameter of the filler contained in the resin layer may be in a range of 0.001 µm to 80 µm. In another example, the average particle diameter of the filler may be 0.01 µm or more, 0.1 or more, 0.5 µm or more, 1 µm or more, 2 µm or more, 3 µm or more, 4 µm or more, 5 µm or more, or about 6 µm or more. In another example, the average particle diameter of the filler may be about 75 µm or less, about 70 µm or less, about 65 µm or less, about 60 µm or less, about 55 µm or less, about 50 µm or less, about 45 µm or less, about 40 µm or less, about 35 µm or less, about 30 µm or less, about 25 µm or less, about 20 µm or less, about 15 µm or less, about 10 µm or less, or about 5 µm or less.

The ratio of the filler contained in the resin layer having low thermal conductivity can be selected in consideration of the desired thixotropy and the like. For example, the filler may be contained in a range of about 100 to 300 parts by weight relative to 100 parts by weight of the resin component of the resin layer.

The resin layer may further comprise a viscosity controlling agent, such as a thixotropic agent, a diluent, a dispersant, a surface treatment agent or a coupling agent, for adjusting viscosity, if necessary, for example, for raising or lowering viscosity or for controlling viscosity depending on shear force.

The thixotropic agent controls the viscosity of the resin composition depending on the shear force, whereby the process of manufacturing the battery module can be effectively performed. As the usable thixotropic agent, fumed silica and the like can be exemplified.

The diluent or dispersant is usually used for lowering the viscosity of the resin composition, and any of various kinds known in the art can be used without limitation as long as it can exhibit the above action.

The surface treatment agent is for surface treatment of the filler introduced into the resin layer, and any of various kinds known in the art can be used without limitation as long as it can exhibit the above action.

The coupling agent may be used, for example, to improve the dispersibility of the thermally conductive filler such as alumina, and any of various kinds known in the art may be used without limitation as long as it can exhibit the above action.

The resin layer may further comprise a flame retardant or a flame retardant aid agent, and the like. Such a resin layer can form a flame retardant resin layer. As the flame retardant, various known flame retardants can be applied without particular limitation, and for example, solid filler type flame retardants and liquid flame retardants can be applied. The flame retardant includes, for example, organic flame retardants such as melamine cyanurate and inorganic flame retardants such as magnesium hydroxide, but is not limited thereto.

When the amount of the filler filled in the resin layer is large, a liquid type flame retardant material (TEP, triethyl phosphate, or TCPP, tris(1,3-chloro-2-propyl)phosphate, etc.) may also be used. In addition, a silane coupling agent capable of acting as a flame retardant synergist may also be added.

In one example, the battery module may further comprise an insulating layer between the module case and the battery cell or between the resin layer and the module case. FIG. 7 is an example in which the insulating layer (40) is formed between the resin layer (30) and the guiding portion (10*d*) formed on the bottom plate (10*a*) of the case. By adding an insulating layer, it is possible to prevent problems such as an electrical short phenomenon or a fire due to a contact between the cell and the case by an impact that may occur during use. The insulating layer may be formed using an insulating sheet having high insulation and thermal conductivity, or may be formed by applying or injecting a material exhibiting insulating properties. For example, in a method for manufacturing a battery module as described below, a process of forming an insulating layer may be performed before the injection of the resin composition. A so-called TIM (thermal interface material) or the like may be applied in forming the insulating layer. Alternatively, the insulating layer may be formed of an adhesive material, and for example, the insulating layer may also be formed using a resin layer having little or no filler such as thermally conductive fillers. As the resin component which can be used for forming the insulating layer, an acrylic resin, PVC (poly(vinyl chloride)), an olefin resin such as PE (polyethylene), an epoxy resin, silicone or a rubber component such as an EPDM (ethylene propylene diene monomer) rubber, and the like can be exemplified, without being limited thereto. The insulating layer may have an insulation breakdown voltage, as measured according to ASTM D149, of about 5 kV/mm or more, about 10 kV/mm or more, about 15 kV/mm or more, 20 kV/mm or more, 25 kV/mm or more, or 30 kV/mm or more. The higher the value of the insulation breakdown voltage is, the better the insulation shows, and thus it is not particularly limited. For example, the insulation breakdown voltage of the insulating layer may be about 100 kV/mm or less, 90 kV/mm or less, 80 kV/mm or less, 70 kV/mm or less, or 60 kV/mm or less. The thickness of the insulating layer can be set to an appropriate range in consideration of the insulating property and the thermal conductivity of the insulating layer, and the like, and for example, may be about 5 µm or more, 10 µm or more, 20 µm or more, 30 µm or more, 40 µm or more, 50 µm or more, 60 µm or more, 70 µm or more, 80 µm or more, or 90 µm or more or so. In addition, the upper limit of the thickness is not particularly limited and may be, for example, about 1 mm or less, about 200 μm or less, 190 μm or less, 180 μm or less, 170 μm or less, 160 μm or less, or 150 μm or less.

The present application also relates to a method for manufacturing a battery module, for example, the above-mentioned battery module.

The manufacturing method of the present application may comprise steps of injecting a resin composition into the above-described module case; housing a battery cell in the module case, and curing the resin composition to form the resin layer.

The order of the step of injecting the resin composition into the module case and the step of housing the battery cell in the module case is not particularly limited. For example, the resin composition may be first injected into the module case, followed by housing the battery cell in that state, or the battery cell may be first housed inside the module case, followed by injecting the resin composition therein.

As the resin composition, the above-mentioned resin composition can be used.

The method of injecting the resin composition into the module case is not particularly limited, and a known method can be applied. For example, a resin composition may be injected by pouring the resin composition into an opening of a module case, or a method of injecting a resin composition by the above-described injection port formed on a module case, a method of applying a resin composition to both a battery cell and a battery module, and the like may be applied. For proper fixing, the injection process may also be performed while constantly vibrating the battery module or the battery cell.

The manner, in which the battery cell is housed in the module case into which the resin composition is injected or in the module case before the composition is injected, is not particularly limited.

The housing of the battery cells can be performed by arranging the battery cells at suitable positions in the module case in consideration of the desired arrangement and the like. In addition, when the cartridge structure is present, the step can be performed by placing the battery cells at proper positions of the cartridge structure, or inserting the cartridge structure, in which the battery cells are located, into the module case.

After the battery cells are housed therein, adhesion between the battery cells or adhesion between the battery cells and the module case can be achieved by curing the injected resin composition. The manner of curing the resin composition is not particularly limited.

For example, the step can be performed by a method of irradiating the resin composition with an active energy beam such as ultraviolet ray in the case where the resin composition is an active energy beam curing type; by a method of maintaining the resin composition under an appropriate moisture in the case where it is a moisture curing type; by a method of applying an appropriate heat to the resin composition in the case where it is a thermosetting type; or by a method of maintaining the resin composition at room temperature, and the like in the case where it is a room temperature curing type.

In addition, heat may also be applied for a short time, for example, so as to be about 40° C. to 50° C. or so, under conditions without affecting stability of the battery cell in terms of tact time and processability before or during the curing process, or before or during the housing process of the battery cells.

The present application also relates to a resin composition which can be used in the manufacturing method or for forming the battery module of the above-mentioned structure.

As described above, the resin composition is not particularly limited as long as it allows for effectively fixing the battery cells to the module case and can impart the above-mentioned physical properties, if necessary, and any known resin composition can be used, but the application of the urethane resin composition described above may be advantageous.

The present application also relates to a battery pack, for example, a battery pack comprising two or more battery modules as described above. In the battery pack, the battery modules may be electrically connected to each other. A method of electrically connecting two or more battery modules to constitute a battery pack is not particularly limited, and all known methods can be applied thereto.

The present application also relates to a device comprising the battery module or the battery pack. An example of such a device may include, but is not limited to, automobiles such as electric vehicles, where all applications requiring secondary batteries as power may be included. For example, a method of configuring the automobile using the battery module or the battery pack is not particularly limited, and a general method can be applied.

Advantageous Effects

The present application can provide a battery module having excellent power relative to volume, excellent heat dissipation characteristics and excellent durability, while being manufactured in a simple process and at a low cost, a manufacturing method thereof, and a resin composition applied to the manufacturing method.

EXPLANATION OF REFERENCE NUMERALS AND SYMBOLS

10: module case
10a: bottom plate
10b: sidewall
10c: top plate
10d: guiding portion
20: battery cell
30: resin layer
50a: injection hole
50b: observation hole
40: insulating layer
100: pouch type cell
110: electrode assembly
120: exterior material
121: upper pouch
122: lower pouch
S: sealing portion

MODE FOR INVENTION

Hereinafter, the battery module of the present application will be described through examples and comparative examples, but the scope of the present application is not limited by the scope as set forth below.

1. Evaluation Method of Thermal Conductivity of Resin Layer

The thermal conductivity of the resin layer was measured according to ASTM D5470 standard. That is, after placing the resin layer between two copper bars according to ASTM D5470 standard, one of the two copper bars is brought into contact with a heater and the other is brought into contact with a cooler, and then the heater was maintained at a constant temperature, and the capacity of the cooler was adjusted to make a thermal equilibrium state (a state showing temperature change of about 0.1° C. or less in 5 minutes). The temperature of each copper rod was measured in the thermal equilibrium state, and the thermal conductivity (K, unit: W/mK) was evaluated according to the following equation. Upon evaluating the thermal conductivity, the pressure applied to the resin layer was adjusted to be about 11 Kg/25 cm$^2$ or so, and the thermal conductivity was calculated based on the final thickness when the thickness of the resin layer was changed during the measurement process.

<Thermal Conductivity Equation>

$$K=(Q\times dx)/(A\times dT)$$

In Equation above, K is a thermal conductivity (W/mK), Q is a heat (unit: W) moved per unit time, dx is a thickness (unit: m) of the resin layer, A is a cross sectional area (unit: m$^2$) of the resin layer, and dT is a temperature difference (unit: K) of the copper bar.

2. Adhesive Force Measurement

The aluminum pouch used to manufacture the battery cell was cut to a width of about 10 mm. The resin composition was loaded on a glass plate, and the cut aluminum pouch was loaded thereon so that the loaded resin composition was in contact with the PET (poly(ethylene terephthalate)) side of the pouch and then held at room temperature for 24 hours to cure the resin composition. Subsequently, while the aluminum pouch was peeled off at a peeling angle of 180 degrees and a peeling speed of 300 mm/min with a tensile tester, the adhesive force was measured.

3. Shock Test

The shock test of the produced battery module was performed by observing whether or not the module was broken after applying a constant shock three times in the horizontal direction (x-axis), the vertical direction (y-axis) and the thickness direction (z-axis) of the module and confirming whether or not the voltage was also measured even after the shock.

4. Viscosity of Resin Composition

The viscosity of the resin composition was measured at room temperature and a shear rate condition of from 0.01 to 10.0/s using a rheological property measuring machine (ARES). The viscosity mentioned in the examples is a viscosity at a point of a shear rate of 2.5/s, where a TI (thixotropic index) can be determined through a ratio of a viscosity at a point of a shear rate of 1.0/s to a viscosity at a point of a shear rate of 10.0/s.

EXAMPLE 1

Preparation of Composition for First Filler-Containing Cured Resin Layer

A two-component urethane adhesive composition was used. A main composition (viscosity: about 350000 to 400000 cP, based on room temperature and a shear rate of 2.5/s) comprising, as a caprolactone polyol represented by Formula 2 above, a polyol, wherein the number of repeating units (m in Formula 2) is in a level of about 1 to 3 or so and as the polyol-derived unit (Y in Formula 2), ethylene glycol and propylene glycol units are included, was used as the main composition, and a composition comprising polyisocyanate (HDI, hexamethylene diisocyanate) was used as the curing agent composition (viscosity: about 270000 to 300000 cP, based on room temperature and a shear rate of 2.5/s). In order to ensure thixotropy, calcium carbonate as a filler was divided and compounded in the same amount into the main and curing agent compositions so that the weight ratio was about 280 parts by weight or so relative to 100 parts by weight of the total solid content of the main and curing agent compositions. For the formation of the resin layer, the main and curing agent compositions were compounded while adjusting their equivalents and used. The viscosity of each of the main and curing agent compositions described in examples is the viscosity in a state where the filler is compounded. The adhesive force of the prepared composition measured by the above-described method was about 450 gf/10 mm or so.

Preparation of Composition for Second Filler-Containing Cured Resin Layer

A two-component urethane adhesive composition was used. A main composition (viscosity: about 150000 cP, based on room temperature and a shear rate of 2.5/s) comprising, as a caprolactone polyol represented by Formula 2 above, a polyol, wherein the number of repeating units (m in Formula 2) is about 1 to 3 and as the polyol-derived unit (Y in Formula 2), ethylene glycol and propylene glycol units are included, was used as the main composition, and a composition (viscosity: about 170000 cP, based on room temperature and a shear rate of 2.5/s) comprising polyisocyanate (HDI, hexamethylene diisocyanate) was used as the curing agent composition. Alumina was divided and compounded in the same amount into the main and curing agent compositions so as to be an amount (about 750 parts by weight or so relative to 100 parts by weight of the total solid content of the main and curing agent compositions) capable of exhibiting a thermal conductivity of about 3 W/mK after curing the resin composition by compounding alumina to the resin composition so that the thermal conductivity can be exhibited. For the formation of the resin layer, the main and curing agent compositions were compounded while adjusting their equivalents and used. The adhesive force of the prepared composition measured by the above-described method was about 520 gf/10 mm or so.

Manufacture of Battery Module

As a module case having the same shape as FIG. 1, a module case having a bottom plate, sidewalls, and a top plate, made of aluminum, was used. Guiding portions for guiding installation of battery cells were formed on the internal surface of the bottom plate in the module case, injection holes for injecting the resin composition were formed at regular intervals in the central part of the top plate and the bottom plate in the module case, and observation holes were formed at the end of the top plate and the bottom plate. A bundle of pouches laminating a plurality of battery pouches was housed in the module case. Subsequently, the top plate was covered on the upper surface of the module case. Thereafter, the compositions for the first and second filler-containing cured resin layers were injected into the respective injection holes of the top plate and the bottom plate, respectively, until it was confirmed that the compositions to be injected had reach the observation hole, and then cured to prepare a battery module.

As a result of performing a shock test on the battery module in the above-mentioned manner, no breakage of the module was observed, and the voltage could be measured even after the shock test.

EXAMPLE 2

Preparation of Composition for a First Filler-Containing Cured Resin Layer

To ensure thixotropy, calcium carbonate as a filler in the same main and curing agent compositions as the resin composition for the second filler-containing cured resin layer of Example 1, was divided and compounded in the same amount into the main and curing agent compositions so that the weight ratio was about 280 parts by weight or so relative to 100 parts by weight of the total solid content of the main and curing agent compositions. For the formation of the resin layer, the main and curing agent compositions were compounded while adjusting their equivalents and used. The viscosity of the main composition was in a level of about 150000 cP (based on room temperature and a shear rate of 2.5/s) and the viscosity of the curing agent composition was in a level of about 170000 cP (based on room temperature and a shear rate of 2.5/s). The adhesive force of the prepared composition measured by the above-described method was about 510 gf/10 mm or so.

Manufacture of Battery Module

A battery module was manufactured in the same manner as in Example 1, except that the composition for the first filler-containing cured resin layer as prepared above and the composition for the second filler-containing cured resin layer prepared in Example 1 were used.

As a result of performing a shock test on the battery module in the above-mentioned manner, no breakage of the module was observed, and the voltage could be measured even after the shock test.

COMPARATIVE EXAMPLE 1

A battery module was manufactured in the same manner as in Example 1, except that no resin layer (first filler-containing cured resin layer) was formed between the top plate and the battery cell, but instead a urethane pad was inserted therebetween, and a resin layer was formed by applying the following silicone resin composition between the bottom plate and the battery cell. A resin composition having a viscosity at room temperature of about 130,000 cP or so prepared by mixing alumina (particle size distribution: 1 μm to 60 μm) in a two-component silicone adhesive composition (main: SL5100A (manufactured by KCC), curing agent: SL5100B (manufactured by KCC)) in an amount (in a range of about 800 to 1200 parts by weight relative to 100 parts by weight of the combined two-component solid contents) capable of exhibiting a thermal conductivity of about 3 W/mK after curing the two-component silicone adhesive composition, was used as the silicone resin composition applied between the bottom plate and the battery cell.

As a result of performing a shock test on the battery module in the above-mentioned manner, breakage of the module was observed, and it was impossible to measure the voltage after the shock test.

COMPARATIVE EXAMPLE 2

A battery module was manufactured in the same manner as in Comparative Example 1, except that an injection-molded plastic was used instead of the urethane pad between the top plate and the battery cell.

As a result of performing a shock test on the battery module in the above-mentioned manner, breakage of the module was observed, and it was impossible to measure the voltage after the shock test.

The invention claimed is:

1. A battery module, comprising:
   a module case having an internal space formed by a top plate, a bottom plate and sidewalls of the module case;
   a plurality of battery cells disposed in the internal space;
   a first filler-containing cured resin layer in contact with both the top plate and the plurality of battery cells; and
   a second filler-containing cured resin layer in contact with both the bottom plate and the plurality of battery cells,
   wherein thermal conductivities of the first and second filler-containing cured resin layers are different from each other,
   wherein the first filler-containing cured resin layer is an adhesive layer attached to both the top plate and the plurality of battery cells, and
   wherein the second filler-containing cured resin layer is an adhesive layer attached to both the bottom plate and the plurality of battery cells,
   wherein the first or the second filler-containing cured resin layer comprises an urethane resin, the urethane resin comprising an polyol-derived unit and a polyisocyanate-derived unit and
   wherein the polyol-derived unit is an amorphous polyol or a polyol having a melting point (Tm) of 20° C. or lower and has a molecular weight in a range from 300 to 2,000.

2. The battery module according to claim 1, wherein the thermal conductivity of the first filler-containing cured resin layer is 1.0 W/mK or less, and the thermal conductivity of the second filler-containing resin layer is 1.5 W/mK or more.

3. The battery module according to claim 1, wherein the first and second filler-containing cured resin layers have an insulation breakdown voltage of 10 kV/mm or more.

4. The battery module according to claim 1, wherein the first and second filler-containing cured resin layers have adhesive force of 200 gf/10 mm or more.

5. The battery module according to claim 1, wherein the first and second filler-containing cured resin layers comprise urethane resins.

6. The battery module according to claim 5, wherein the polyol is an ester-based polyol.

7. The battery module according to claim 6, wherein the ester-based polyol is represented by Formula 1 or 2 below.

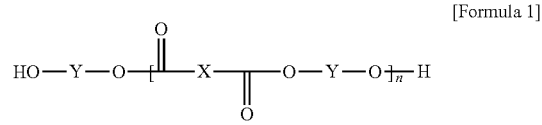

[Formula 1]

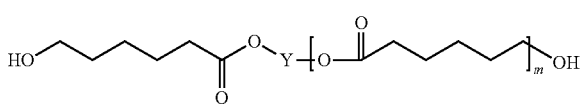

[Formula 2]

wherein, X is a dicarboxylic acid-derived unit, Y is a polyol-derived unit, n is a number in a range of 2 to 10 and m is a number in a range of 1 to 10.

8. The battery module according to claim 7, wherein the dicarboxylic acid-derived unit is one or more units selected from the group consisting of a phthalic acid-derived unit, an isophthalic acid-derived unit, a terephthalic acid-derived unit, a trimellitic acid-derived unit, a tetrahydrophthalic acid-derived unit, a hexahydrophthalic acid-derived unit, a tetrachlorophthalic acid-derived unit, an oxalic acid-derived unit, an adipic acid-derived unit, an azelaic acid-derived unit, a sebacic acid-derived unit, a succinic acid-derived unit, a malic acid-derived unit, a glutaric acid-derived unit, a malonic acid-derived unit, a pimelic acid-derived unit, a suberic acid-derived unit, a 2,2-dimethylsuccinic acid-derived unit, a 3,3-dimethylglutaric acid-derived unit, a 2,2-dimethylglutaric acid-derived unit, a maleic acid-derived unit, a fumaric acid-derived unit, an itaconic acid-derived unit and a fatty acid-derived unit.

9. The battery module according to according to claim 7, wherein the polyol-derived unit Y is any one or two or more units selected from the group consisting of an ethylene glycol-derived unit, a propylene glycol-derived unit, a 1,2-butylene glycol-derived unit, a 2,3-butylene glycol-derived unit, a 1,3-propanediol-derived unit, a 1,3-butanediol-derived unit, a 1,4-butanediol unit, a 1,6-hexanediol-derived unit, a neopentyl glycol-derived unit, a 1,2-ethylhexyldiol-derived unit, a 1,5-pentanediol-derived unit, a 1,10-decanediol-derived unit, a 1,3-cyclohexanedimethanol-derived unit, a 1,4-cyclohexanedimethanol-derived unit, a glycerin-derived unit and a trimethylol propane-derived unit.

10. The battery module according to claim 1, wherein the polyisocyanate-derived unit is an alicyclic polyisocyanate-derived unit, a carbodiimide-modified alicyclic polyisocyanate-derived unit, or an isocyanurate-modified alicyclic polyisocyanate-derived unit.

11. The battery module according to claim 1, wherein the first filler-containing cured resin layer comprises fumed silica, clay, calcium carbonate, alumina, aluminum nitride (AlN), boron nitride (BN), silicon nitride, silicon carbide (SiC), beryllium oxide (BeO), or a carbon filler.

12. The battery module according to claim 11, wherein the first filler-containing cured resin layer comprises the filler in an amount of 100 to 300 parts by weight relative to 100 parts by weight of a resin component of the first filler-containing cured resin layer.

13. The battery module according to claim 1, wherein the second filler-containing cured resin layer comprises a thermally conductive filler which is ceramic particles or a carbon-based filler.

14. The battery module according to claim 13, wherein the second filler-containing cured resin layer comprises the filler in an amount of 500 to 2,000 parts by weight relative to 100 parts by weight of a resin component of the second filler-containing cured resin layer.

15. The battery module according to claim 1, wherein the first or second filler-containing cured resin layer comprises a thixotropic agent, a diluent, a dispersant, a surface treatment agent, a flame retardant or a coupling agent.

16. The battery module according to claim 1, wherein the first or second filler-containing resin layer has a thickness in a range of 100 μm to 5 mm.

17. A method for manufacturing the battery module of claim 1, comprising:
    injecting a first resin composition through one or more injection holes in the top plate of the module case, the first resin composition for forming the first filler-containing resin layer;
    injecting a second resin composition through one or more injection holes in the bottom plate of the module case, wherein the second resin composition for forming the second filler-containing resin layer; and
    curing the first and second resin compositions to form first and second filler-containing cured resin layers, respectively.

18. A battery pack, comprising:
    two or more battery modules of claim 1 electrically connected to each other.

19. An automobile, comprising:
    one or more battery modules of claim 1.

* * * * *